United States Patent
Wang et al.

(10) Patent No.: US 11,886,305 B2
(45) Date of Patent: Jan. 30, 2024

(54) METHOD AND APPARATUS FOR EXPANDING CLOUD VOLUME, AND DEVICE AND READABLE MEDIUM

(71) Applicant: INSPUR SUZHOU INTELLIGENT TECHNOLOGY CO., LTD., Jiangsu (CN)

(72) Inventors: Pengfei Wang, Jiangsu (CN); Xianwei Meng, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/259,837

(22) PCT Filed: Oct. 29, 2021

(86) PCT No.: PCT/CN2021/127508
§ 371 (c)(1),
(2) Date: Jun. 29, 2023

(87) PCT Pub. No.: WO2023/000535
PCT Pub. Date: Jan. 26, 2023

(65) Prior Publication Data
US 2023/0393950 A1    Dec. 7, 2023

(30) Foreign Application Priority Data

Jul. 19, 2021   (CN) .......................... 202110812302.9

(51) Int. Cl.
*G06F 11/14* (2006.01)
(52) U.S. Cl.
CPC ...... *G06F 11/1464* (2013.01); *G06F 11/1451* (2013.01); *G06F 2201/84* (2013.01)

(58) Field of Classification Search
CPC ............ G06F 11/1464; G06F 11/1451; G06F 2201/84

(Continued)

(56) References Cited

U.S. PATENT DOCUMENTS

| 2019/0129621 A1 | 5/2019 | Kushwah et al. |
| 2021/0216410 A1 | 7/2021 | Jin et al. |

FOREIGN PATENT DOCUMENTS

| CN | 105095102 A | 11/2015 |
| CN | 109902034 A | 6/2019 |

(Continued)

OTHER PUBLICATIONS

International Search Report and Written Opinion for PCT/CN2021/127508 (dated Apr. 20, 2022).

(Continued)

*Primary Examiner* — David Yi
*Assistant Examiner* — Zubair Ahmed
(74) *Attorney, Agent, or Firm* — Merchant & Gould P.C.

(57) ABSTRACT

A method and apparatus for expanding cloud volume, and a device and a readable medium are provided. The method includes: determining whether there is an request of a host in a cloud volume and confirming a snapshot started during cloud backup (S1); in response to there being no IO request, expanding a snapshot volume of the snapshot started during the cloud backup and the cloud volume (S2); expanding a bitmap of the snapshot started during the cloud backup, and setting a bitmap obtained by expanding as a first preset value (S3); after completion of a cloud backup task, expanding a snapshot volume of an another snapshot that is not started in the cloud backup (S4); and expanding a bitmap of the another snapshot that is not started in the the present cloud backup, and setting a bitmap obtained by expanding as a second preset value (S5).

20 Claims, 3 Drawing Sheets

(58) Field of Classification Search
USPC .................................................. 711/162, 161
See application file for complete search history.

(56) References Cited

FOREIGN PATENT DOCUMENTS

| CN | 110209342 A | 9/2019 |
| CN | 111930562 A | 11/2020 |
| CN | 111949223 A | 11/2020 |
| CN | 111984469 A | 11/2020 |
| CN | 112328170 A | 2/2021 |
| CN | 113282250 A | 8/2021 |

OTHER PUBLICATIONS

Search Report for Chinese Patent Application No. 2021108123029 (dated Aug. 23, 2021).

METHOD AND APPARATUS FOR EXPANDING CLOUD VOLUME, AND DEVICE AND READABLE MEDIUM

CROSS-REFERENCE TO RELATED APPLICATION

The present application is a National Stage Application of PCT International Application No. PCT/CN2021/127508 filed on Oct. 29, 2021, which claims priority to Chinese Patent Application No. 202110812302.9 filed to the China National Intellectual Property Administration on Jul. 19, 2021 and entitled "Method and Apparatus for Expanding Cloud Volume, and Device and Readable Medium", the disclosure of which is hereby incorporated by reference in its entirety.

TECHNICAL FIELD

The field relates to the field of computers, and particularly, to a method and apparatus for expanding cloud volume, and a device and a readable medium.

BACKGROUND

Cloud volume is a time point-based data protection technology, which may upload data at a certain time in local storage to cloud storage for backup. Similar to data backup, cloud backup has the following advantages compared with local data backup: the cost is low, additional factories, power supply facilities, and the like are not required, and the cloud backup can be performed as long as there is a network; and maintenance is simple, additional storage maintenance personnel are not required, and internal maintenance is handled by respective cloud service providers.

The existing cloud backup technology supports full data backup and incremental data backup. When a cloud backup operation is performed for the first time, all data in a cloud volume is uploaded to a cloud. When the cloud backup operation is subsequently performed again, only the data that changes in the volume will be uploaded. Therefore, the occupancy of cloud storage will be greatly reduced.

Cloud backup technology is implemented based on a snapshot technology. When a cloud backup task is performed, a snapshot will be created for a cloud volume first. What is stored in a snapshot volume is the data of the cloud volume at that time. No matter how the data of the cloud volume changes afterwards, the data of the snapshot volume will not be affected. Finally, the data will be read out from the snapshot volume and uploaded to the cloud. When data is uploaded, a present cloud backup task is ended.

When the cloud backup is started for the first time, a snapshot A is started, and the system reads data from a snapshot volume A and uploads the data to the cloud. In this process, if the data of the cloud volume changes, a bitmap of the snapshot A will records the location of the data that changes. When the cloud backup is started again, a snapshot B will be started, and then corresponding data (that is, the data that changes) is read out from the snapshot B and is uploaded to the cloud by taking the bitmap of the snapshot A as a reference. In this process, if the data of the cloud volume changes, a bitmap of the snapshot B will records the location of the data that changes. When the present cloud backup task is completed, the snapshot A is stopped, and the bitmap of the A is cleared. When the cloud backup is started for the third time, the snapshot A will be started again, and then corresponding data (that is, the data that changes) is read out from the snapshot A and is uploaded to the cloud by taking the bitmap of the snapshot B as a reference. In this process, if the data of the cloud volume changes, a bitmap of the snapshot A will records the location of the data that changes. When the present cloud backup task is completed, the snapshot B is stopped, and the bitmap of the B is cleared. In this way, the two snapshots of A and B are started in turn, which uploads incremental data to the cloud.

Volume expansion technology will increase the capacity of an existing volume, so as to achieve the purpose of storing more data. At present, the cloud volume does not support a volume expansion operation. If the cloud volume needs to be subjected to volume expansion, the cloud backup operation has to be stopped, and two snapshots thereof need to be deleted. Then, volume expansion is performed. After the volume expansion is completed, the configuration of the cloud volumes also needs to be recovered to realize a subsequent cloud backup function. Such operation is not only cumbersome, but also cannot immediately start incremental data backup after the cloud volume is recovered. Incremental backup can only be continued to be performed only after full backup is performed once first.

SUMMARY

In view of this, an objective of the embodiments of the present disclosure is to provide a method and apparatus for expanding cloud volume, and a device and a readable medium.

An aspect of the embodiments of the present disclosure provides a method for expanding cloud volume, which includes:

in response to receiving a cloud volume expansion instruction in a cloud backup process, whether there is an Input/Output (IO) request of a host in a cloud volume is determined and a snapshot started during the present cloud backup is confirmed;

in response to there being no IO request of the host in the cloud volume, a snapshot volume of the snapshot started during the present cloud backup and the cloud volume are expanded;

a bitmap of the snapshot started during the present cloud backup is expanded, and a bitmap obtained by expanding is set as a first preset value;

after completion of a present cloud backup task, a snapshot volume of an another snapshot that is not started in a process of the present cloud backup is expanded;

a bitmap of the another snapshot that is not started in the process of the present cloud backup is expanded, and a bitmap obtained by expanding is set as a second preset value.

According to one embodiment of the present disclosure, the method further includes:

in response to starting cloud backup for a first time, the bitmap of one snapshot is set as 1, and data copying is performed on the other snapshot by taking the bitmap of the one snapshot as a reference.

According to one embodiment of the present disclosure, the method further includes:

in response to there being the IO request of the host in the cloud volume, the IO request of the host is paused, and the snapshot volume of the snapshot started during the present cloud backup and the cloud volume are expanded;

the bitmap of the snapshot started during the present cloud backup is expanded, and the bitmap obtained by expanding is set as the first preset value;

the IO request of the host is recovered, and after the completion of the present cloud backup task, the snapshot volume of the another snapshot that is not started in the present cloud backup process is expanded;

the bitmap of the another snapshot that is not started in the process of the present cloud backup is expanded, and the bitmap obtained by expanding is set as the second preset value.

According to one embodiment of the present disclosure, the bitmap of the snapshot started during the present cloud backup is expanded, and the bitmap obtained by expanding is set as the first preset value includes:

all bits of the bitmap obtained by expanding are set as 1.

According to one embodiment of the present disclosure, the bitmap of the another snapshot that is not started in the process of the present cloud backup is expanded, and the bitmap obtained by expanding is set as the second preset value includes:

All bits of the bitmap obtained by expanding are set as 0.

According to another aspect of the embodiments of the present disclosure, an apparatus for expanding cloud volume is further provided. The apparatus includes:

a determination component, the determination component being configured to: in response to receiving a cloud volume expansion instruction in a cloud backup process, determine whether there is an Input/Output (IO) request of a host in a cloud volume and confirm a snapshot started during present cloud backup;

a first expansion component, the first expansion component being configured to: in response to there being no IO request of the host in the cloud volume, expand a snapshot volume of the snapshot started during the present cloud backup and the cloud volume;

a second expansion component, the second expansion component being configured to: expand a bitmap of the snapshot started during the present cloud backup, and set a bitmap obtained by expanding as a first preset value;

a third expansion component, the third expansion component being configured to: after completion of a present cloud backup task, expand a snapshot volume of an another snapshot that is not started in a process of the present cloud backup;

a fourth expansion component, the fourth expansion component being configured to expand a bitmap of the another snapshot that is not started in the process of the present cloud backup, and set a bitmap obtained by expanding as a second preset value.

According to one embodiment of the present disclosure, the apparatus further includes a starting component, and the starting component is configured to:

in response to starting cloud backup for a first time, set a bitmap of one snapshot as 1, and perform data copying on another snapshot by taking the bitmap of the one snapshot as a reference.

According to one embodiment of the present disclosure, the apparatus further includes a recovery component, and the recovery component is configured to:

in response to there being the IO request of the host in the cloud volume, pause the IO request of the host and expand the snapshot volume of the snapshot started during the present cloud backup and the cloud volume;

expand the bitmap of the snapshot started during the present cloud backup, and set the bitmap obtained by expanding as the first preset value;

recover the IO request of the host, and after the completion of the present cloud backup task, expand the snapshot volume of the another snapshot that is not started in the process of the present cloud backup; and expand the bitmap of the another snapshot that is not started in the process of the present cloud backup, and set the bitmap obtained by expanding as the second preset value.

According to another aspect of the embodiments of the present disclosure, a computer device is further provided. The computer device includes:

at least one processor; and a memory, and the memory stores computer instructions capable of running on the processor. The instructions implement steps of any one of the above methods when executed by the processor.

Another embodiment of the embodiments of the present disclosure, a computer-readable storage medium is further provided. The computer-readable storage medium stores a computer program, and the computer program implements steps of any one of the above methods when executed by the processor.

BRIEF DESCRIPTION OF THE DRAWINGS

In order to illustrate the embodiments of the present disclosure or the technical solutions in the conventional art more clearly, the drawings that need to be used in the description of the embodiments or the conventional art will be briefly described below. It is apparent that the drawings in the following description are only some embodiments of the present disclosure, and other drawings can be obtained by those skilled in the art according to these drawings without any creative work.

DETAILED DESCRIPTION OF THE EMBODIMENTS

In order to make the purposes, technical solutions, and advantages of the present disclosure clearer, the embodiments of the present disclosure will be further described in detail below with reference to specific embodiments and the drawings.

Figure 1:
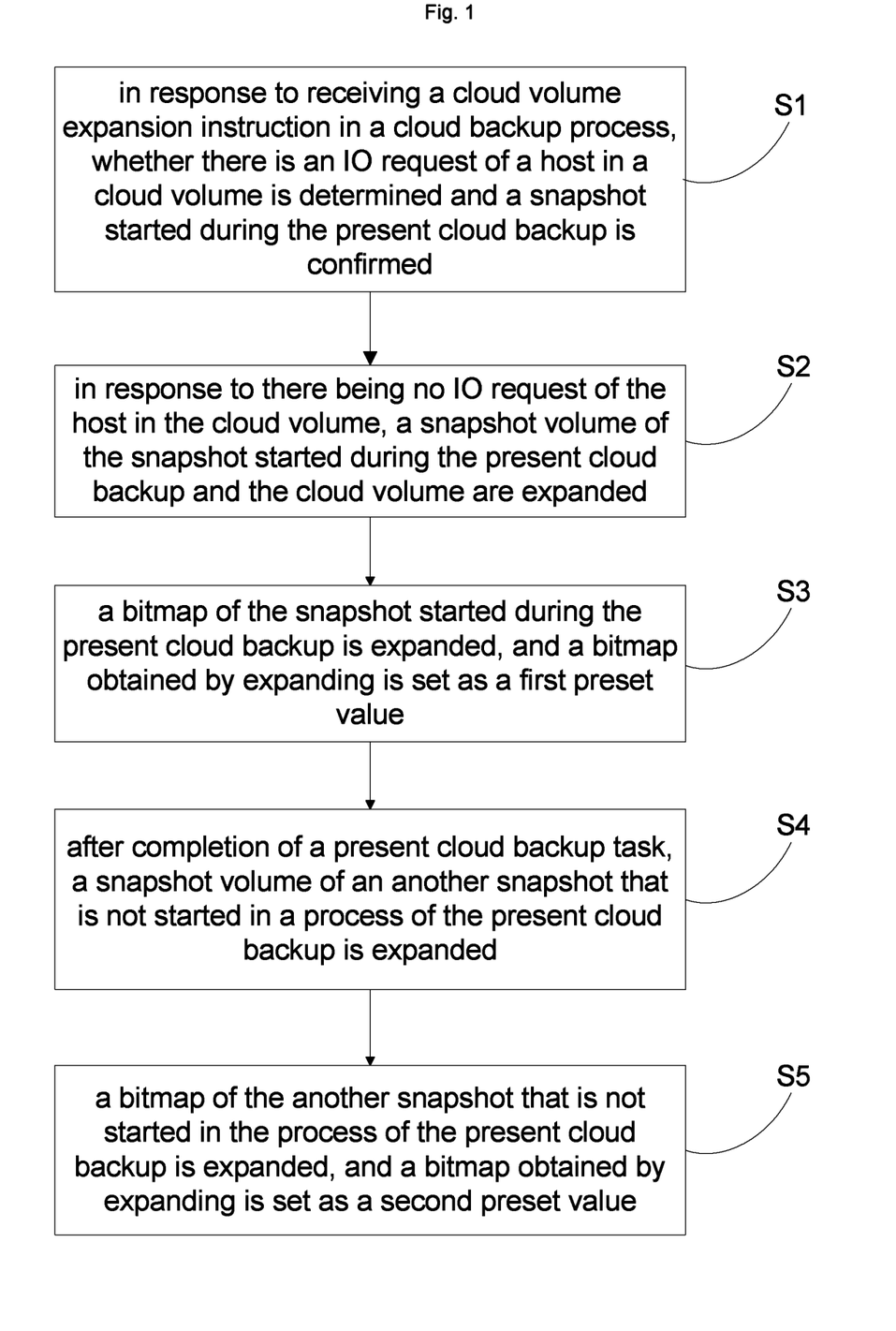
FIG. 1 is a schematic flowchart of a method for expanding cloud volume according to an embodiment of the present disclosure.

Based on the above objective, a first aspect of the embodiments of the present disclosure provides an embodiment of a method for expanding cloud volume. FIG. 1 is a schematic flowchart of the method.

As shown in FIG. 1, the method may include the following steps.

S1, in response to receiving a cloud volume expansion instruction in a cloud backup process, whether there is an IO request of a host in a cloud volume is determined and a snapshot started during the present cloud backup is confirmed.

If there is the IO request in the cloud volume, expansion is performed after pausing the IO request of the host. In a cloud backup process, one of the two snapshots is started, and which snapshot is started in the present cloud backup needs to be determined.

S2, in response to there being no IO request of the host in the cloud volume, a snapshot volume of the snapshot started during the present cloud backup and the cloud volume are expanded.

If there is no IO request of the host in the cloud volume, the snapshot volume of the snapshot started during the present cloud backup and the cloud volume are directly expanded. If there is the IO request of the host in the cloud volume, the IO request of the host needs to be paused first, and then the snapshot volume of the snapshot started during the present cloud backup and the cloud volume are expanded.

S3, a bitmap of the snapshot started during the present cloud backup is expanded, and a bitmap obtained by expanding is set as a first preset value.

After the snapshot volume and the cloud volume are expanded, the bitmap of the snapshot started during the present cloud backup is correspondingly expanded, and all bits of the bitmap obtained by expanding are set as 1. Since the snapshot is data protection based on a time point, the cloud volume does not have any newly expanded space when the snapshot is created, after the cloud volume is expanded, the data of these spaces does not need to be uploaded to the cloud this time, but needs to be incrementally uploaded to the cloud next time. Therefore, the bitmap of this part of space need to be set as 1. If the IO request of the host is previously paused, then the IO request of the host may be recovered.

S4, after completion of a present cloud backup task, a snapshot volume of an another snapshot that is not started in a process of the present cloud backup is expanded.

There are usually two snapshots and snapshot volumes in the cloud backup. When the present cloud backup task is completed, the snapshot volume of the another snapshot that is not started is expanded.

S5, a bitmap of the another snapshot that is not started in the process of the present cloud backup is expanded, and a bitmap obtained by expanding is set as a second preset value.

The bitmap of the another snapshot that is not started is correspondingly expanded, and all bits of the bitmap obtained by expanding are set as 0.

If a cloud backup operation is started again, the cloud volume, a snapshot volume 1, and a snapshot volume 2 all have expanded capacity, and the newly expanded bitmap of the snapshot 1 is also marked as 1. In this way, the newly expanded data will be considered as data that changes when the cloud backup is started again, and the newly expanded data will also be uploaded to the cloud, which ensures the accuracy of cloud data.

By the technical solution of the present disclosure, an expansion operation can be performed on the cloud volume in a process of executing a cloud backup task, and the accuracy of cloud data can be ensured.

The present disclosure has the following beneficial technical effects: by the method for expanding the cloud volume provided by the embodiment of the application, through a technical solution that in response to receiving the cloud volume expansion instruction in the cloud backup process, whether there is the IO request of the host in the cloud volume is determined and the snapshot started during the present cloud backup is confirmed; in response to there being no IO request of the host in the cloud volume, the snapshot volume of the snapshot started during the present cloud backup and the cloud volume are expanded; the bitmap of the snapshot started during the present cloud backup is expanded, and the bitmap obtained by expanding is set as the first preset value; after the completion of the present cloud backup task, the snapshot volume of the another snapshot that is not started in the process of the present cloud backup is expanded; and the bitmap of the another snapshot that is not started in the process of the present cloud backup is expanded, and the bitmap obtained by expanding is set as a second preset value, a expansion operation can be performed on the cloud volume in a process of executing a cloud backup task, and the accuracy of cloud data can be ensured.

In some embodiments of the present disclosure, the method further includes:

in response to starting cloud backup for a first time, the bitmap of one snapshot is set as 1, and data copying is performed on the other snapshot by taking the bitmap of the one snapshot as a reference.

When the cloud backup is performed for the first time, if the expansion operation needs to be performed, the accuracy of cloud data can be ensured. After the cloud backup is started for the first time and before the expansion operation is completed for the first time, the data before expanding is stored on the cloud. However, in the original logic, the first cloud backup directly uploads full data based on the bitmap of a first snapshot. After the expansion is completed, the bitmap of the first snapshot is also expanded, so that data of the expanded cloud volume is also stored on the cloud. During first start, the bitmap of the second snapshot is set as 1, and then data transmission is performed according to the bitmap of the second snapshot. Since the expansion of the bitmap of the second snapshot occurs after the completion of the first cloud backup, the data uploaded in the first cloud backup cannot be affected.

In some embodiments of the present disclosure, the method further includes:

in response to there being the IO request of the host in the cloud volume, the IO request of the host is paused, and the snapshot volume of the snapshot started during the present cloud backup and the cloud volume are expanded;

the bitmap of the snapshot started during the present cloud backup is expanded, and the bitmap obtained by expanding is set as the first preset value;

the IO request of the host is recovered, and after the completion of the present cloud backup task, the snapshot volume of the another snapshot that is not started in the process of the present cloud backup is expanded;

the bitmap of the another snapshot that is not started in the process of the present cloud backup is expanded, and the bitmap obtained by expanding is set as the second preset value.

In some embodiments of the present disclosure, the bitmap of the snapshot started during the present cloud backup is expanded, and the bitmap obtained by expanding is set as the first preset value includes:

all bits of the bitmaps obtained by expanding are set as 1.

In some embodiments of the present disclosure, the bitmap of the another snapshot that is not started in the process of the present cloud backup is expanded, and the bitmap obtained by expanding is set as the second preset value includes:

all bits of the bitmaps obtained by expanding are set as 0.

By the technical solution of the present disclosure, an expansion operation can be performed on a cloud volume in a process of executing a cloud backup task, and the accuracy of cloud data can be ensured.

It is to be noted that, those skilled in the art may understand that all or part of the processes in the above method embodiments may be implemented by a computer program to instruct related hardware, and the above program may be stored in computer-readable storage medium. When the program is executed, the flow of the embodiment including various methods as described above may be included. The storage medium may be a magnetic disk, an optical disk, a Read-Only Memory (ROM), a Random Access Memory (RAM), or the like. The abovementioned embodiment of the computer program may achieve the same or similar effects as any foregoing method embodiment corresponding thereto.

In addition, the method disclosed according to the embodiments of the present disclosure may also be implemented as a computer program executed by a Central Processing Unit (CPU). The computer program may be stored in a computer-readable storage medium. When the computer program is executed by the CPU, the above functions defined in the methods disclosed in the embodiments of the present disclosure are executed.

Figure 2:
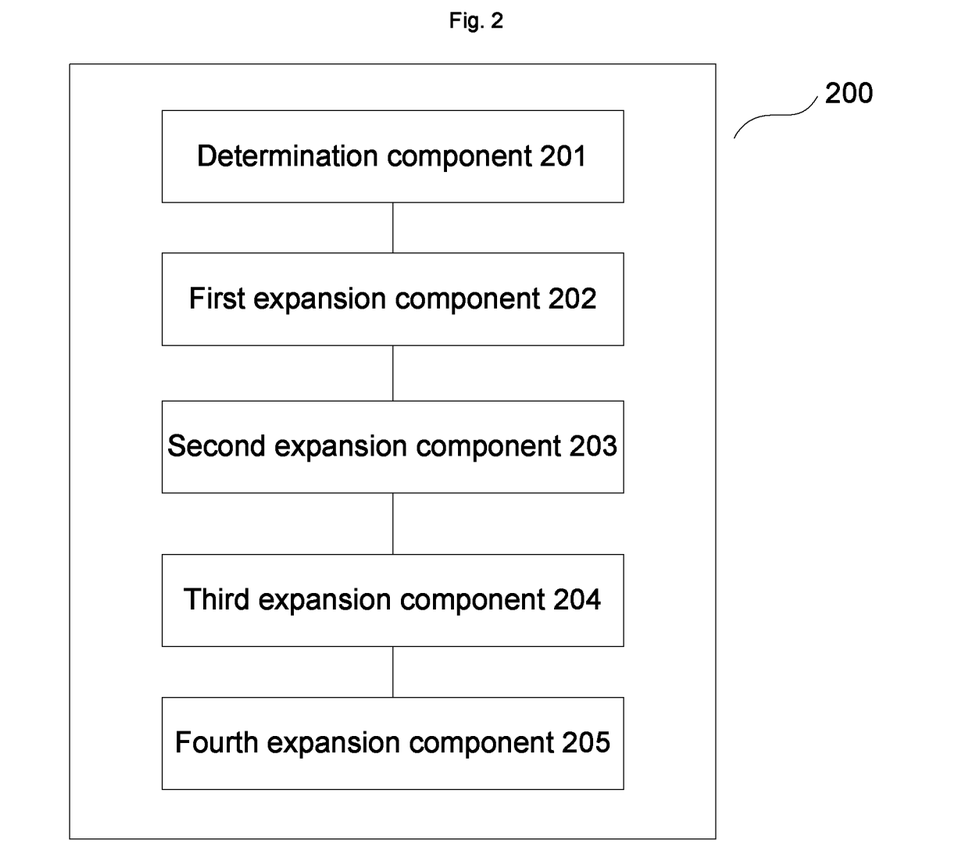
FIG. 2 is a schematic diagram of an apparatus for expanding cloud volume according to an embodiment of the present disclosure.

Based on the above objective, a second aspect of the embodiments of the present disclosure provides an apparatus for expanding cloud volume. As shown in FIG. 2, the apparatus 200 includes:

a determination component 201, the determination component 201 being configured to: in response to receiving a cloud volume expansion instruction in a cloud backup process, determine whether there is an Input/Output (IO) request of a host in a cloud volume and confirm a snapshot started during present cloud backup;

a first expansion component 202, the first expansion component 202 being configured to: in response to there being no IO request of the host in the cloud volume, expand a snapshot volume of the snapshot started during the present cloud backup and the cloud volume;

a second expansion component 203, the second expansion component 203 being configured to: expand a bitmap of the snapshot started during the present cloud backup, and set a bitmap obtained by expanding as a first preset value;

a third expansion component 204, the third expansion component 204 being configured to: after completion of a present cloud backup task, expand a snapshot volume of an another snapshot that is not started in a process of the present cloud backup; and a fourth expansion component 205, the fourth expansion component 205 being configured to expand a bitmap of the another snapshot that is not started in the process of the present cloud backup, and set a bitmap obtained by expanding as a second preset value.

In some embodiment of the present disclosure, the apparatus further includes a starting component. The starting component is configured to:

in response to starting cloud backup for a first time, set a bitmap of one snapshot as 1, and perform data copying on another snapshot by taking the bitmap of the one snapshot as a reference.

In some embodiment of the present disclosure, the apparatus further includes a recovery component. The recovery component is configured to:

in response to there being the IO request of the host in the cloud volume, pause the IO request of the host and expand the snapshot volume of the snapshot started during the present cloud backup and the cloud volume;

expand the bitmap of the snapshot started during the present cloud backup, and set the bitmap obtained by expanding as the first preset value;

recover the IO request of the host, and after the completion of the present cloud backup task, expand the snapshot volume of the another snapshot that is not started in the process of the present cloud backup; and expand the bitmap of the another snapshot that is not started in the process of the present cloud backup, and set the bitmap obtained by expanding as the second preset value.

Figure 3:
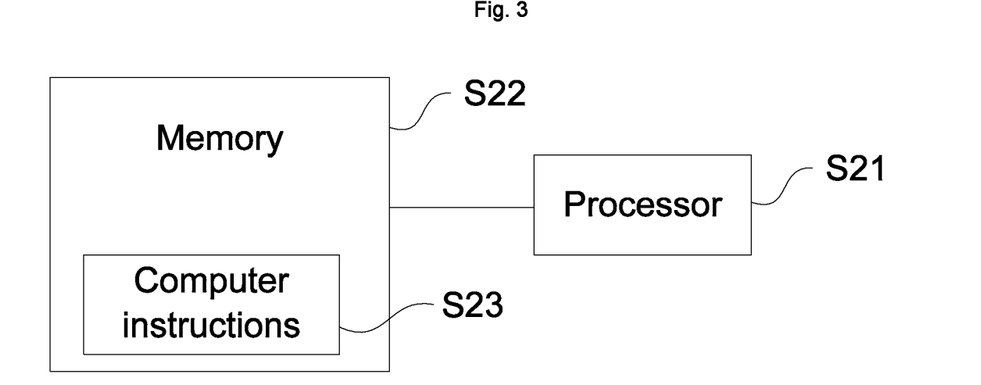
FIG. 3 is a schematic diagram of a computer device according to an embodiment of the present disclosure.

Based on the above objective, a third aspect of the embodiments of the present disclosure provides a computer device. FIG. 3 illustrates a schematic diagram of an embodiment of a computer device provided by the present disclosure. As shown in FIG. 3, the embodiment of the present disclosure includes the following apparatuses: at least one processor S21, and a memory S22. The memory S22 stores computer instructions S23 capable of running on the processor; and the instructions implement the following method when executed by the processor:

in response to receiving a cloud volume expansion instruction in a cloud backup process, whether there is an IO request of a host in a cloud volume is determined and a snapshot started during the present cloud backup is confirmed;

in response to there being no IO request of the host in the cloud volume, a snapshot volume of the snapshot started during the present cloud backup and the cloud volume are expanded;

a bitmap of the snapshot started during the present cloud backup is expanded, and a bitmap obtained by expanding is set as a first preset value;

after completion of a present cloud backup task, a snapshot volume of an another snapshot that is not started in a process of the present cloud backup is expanded;

a bitmap of the another snapshot that is not started in the process of the present cloud backup is expanded, and a bitmap obtained by expanding is set as a second preset value.

In some embodiment of the present disclosure, the instructions further implement the following method when executed by the processor:

in response to starting cloud backup for a first time, the bitmap of one snapshot is set as 1, and data copying is performed on the other snapshot by taking the bitmap of the one snapshot as a reference.

In some embodiment of the present disclosure, the instructions further implement the following method when executed by the processor:

in response to there being the IO request of the host in the cloud volume, the IO request of the host is paused, and the snapshot volume of the snapshot started during the present cloud backup and the cloud volume are expanded;

the bitmap of the snapshot started during the present cloud backup is expanded, and the bitmap obtained by expanding is set as the first preset value;

the IO request of the host is recovered, and after the completion of the present cloud backup task, the snapshot volume of the another snapshot that is not started in the process of the present cloud backup is expanded;

the bitmap of the another snapshot that is not started in the process of the present cloud backup is expanded, and the bitmap obtained by expanding is set as the second preset value.

In some embodiment of the present disclosure, the bitmap of the snapshot started during the present cloud backup is expanded, and the bitmap obtained by expanding is set as the first preset value includes:

all bits of the bitmaps obtained by expanding are set as 1.

In some embodiments of the present disclosure, the bitmap of the another snapshot that is not started in the process of the present cloud backup is expanded, and the bitmap obtained by expanding is set as the second preset value includes:

all bits of the bitmaps obtained by expanding are set as 0.

Figure 4:
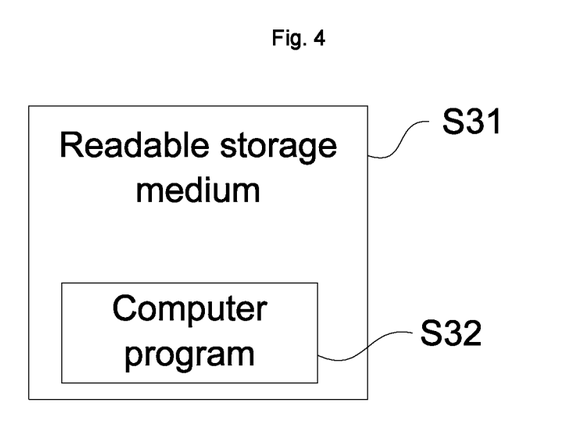
FIG. 4 is a schematic diagram of a computer-readable storage medium according to an embodiment of the present disclosure.

Based on the abovementioned objective, a fourth aspect of the embodiments of the present disclosure provides a computer-readable storage medium. FIG. 4 illustrates a schematic diagram of an embodiment of a computer-readable storage medium provided by the present disclosure. As shown in FIG. 4, the computer-readable storage medium S31 stores a computer program S32 that implements the abovementioned method when being executed by a processor.

In addition, the methods disclosed according to the embodiments of the present disclosure may also be implemented as a computer program executed by a processor, and the computer program may be stored in a computer-readable storage medium. When the computer program is executed by the processor, the abovementioned functions defined in the methods disclosed in the embodiments of the present disclosure are executed.

In addition, the abovementioned method steps and system units may also be implemented by a controller and a computer-readable storage medium for storing a computer program that enables the controller to implement the functions of the abovementioned steps or units.

Those skilled in the art will also appreciate that various exemplary logical blocks, components, circuits, and algorithm steps described in combination with the disclosure herein may be implemented as electronic hardware, computer software, or a combination of the electronic hardware and the computer software. To clearly describe such interchangeability of hardware and software, various illustrative components, blocks, components, circuits, and steps have been described generally in terms of their functionality. Whether such functionality is implemented as software or hardware depends on the specific application and design constraints imposed on the entire system. Those skilled in the art may implement the functions in various ways for each specific application, but such implementation decisions are not to be interpreted as causing a departure from the scope of the disclosed embodiments of the application.

In one or more exemplary designs, functions may be implemented in hardware, software, firmware, or any combination thereof. If the functions are implemented in the software, the functions may be stored on the computer-readable medium as one or more instructions or codes or be transferred by means of the computer-readable medium. The computer-readable medium includes a computer storage medium and a communication medium. The communication medium includes any media transmitting a computer program from one place to another place. The storage medium may be any available media that can be accessed by a general or special computer. As an example but not a limitation, the computer-readable medium may include a RAM, a ROM, an EEPROM, a CD-ROM or other optical disk storage devices, magnetic disk storage devices or other magnetic storage devices, or may be used for carrying or storing the required program code in the form of instructions or data structures, and any other media that can be accessed by a general or special computer or a general or special processor. In addition, any connection may properly be called a computer-readable medium. For example, if a coaxial cable, a fiber optic cable, a twisted pair, a Digital Subscriber Line (DSL), or wireless technologies such as infrared, radio, and microwave are used to transmit software from a website, a server, or other remote sources, then the above coaxial cable, the fiber optic cable, the twisted pair, the DSL, or the wireless technologies such as the infrared, the radio, and the microwave are all included in the definition of the medium. As used herein, the magnetic disk and the optical disk include Compact Disks (CDs), laser disks, optical disks, Digital Versatile Disks (DVDs), floppy disks, Blu-ray disks, and the disks usually reproduce data magnetically, while the optical disks reproduce data optically with lasers. Combinations of the above should also be included within the scope of the computer-readable medium. Combinations of the above content are also to be included within the scope of the computer-readable medium.

The above are exemplary embodiments of the present disclosure, but it is to be noted that, various changes and modifications may be made without departing from the scope disclosed in the embodiments of the present disclosure as defined in the claims. The functions, steps and/or actions of the method claims in accordance with the disclosed embodiments described herein need not be performed in any particular order. In addition, although elements disclosed in the embodiments of the present disclosure may be described or claimed in the singular, unless explicitly limited to the singular, the plural may also be construed.

It is to be understood that, as used herein, the singular form "a" is intended to include the plural form as well, unless the context clearly supports an exception. It is also be understood that, "and/or" as used herein is meant to include any and all possible combinations of one or more of the associated listed items.

The serial numbers of the foregoing embodiments of the present disclosure are merely for description, and do not represent the superiority or inferiority of the embodiments.

Those of ordinary skill in the art may understand that, all or part of the steps in the above embodiments may be completed by means of hardware, or may be completed by instructing the related hardware through a program. The program may be stored in a computer-readable storage medium, and the foregoing storage medium may be a Read Only Memory (ROM), a magnetic disk, or an optical disk.

Those of ordinary skill in the art should understand that the discussion of any of the embodiments above is merely exemplary, and is not intended to imply that the scope (including the claims) disclosed in the embodiments of the present disclosure is limited to these examples. Under the idea of the embodiments of the present disclosure, the technical features in the embodiments above or different embodiments can also be combined. In addition, there are many other changes in different aspects of the embodiments above of the present disclosure, which are not provided in detail for the sake of brevity. Therefore, any omissions, modifications, equivalent replacements, improvements and the like made within the spirit and principle of the embodiments of the present disclosure shall all fall within the protection scope of the embodiments of the present disclosure.

What is claimed is:

1. A method for expanding cloud volume, comprising:
in response to receiving a cloud volume expansion instruction in a cloud backup process, determining whether there is an Input/Output (TO) request of a host in a cloud volume and confirming a snapshot started during present cloud backup;
in response to there being no IO request of the host in the cloud volume, expanding a snapshot volume of the snapshot started during the present cloud backup and the cloud volume;

expanding a bitmap of the snapshot started during the present cloud backup, and setting a bitmap obtained by expanding as a first preset value;

after completion of a present cloud backup task, expanding a snapshot volume of an another snapshot that is not started in a process of the present cloud backup; and expanding a bitmap of the another snapshot that is not started in the process of the present cloud backup, and setting a bitmap obtained by expanding as a second preset value.

2. The method according to claim 1, further comprising:
in response to starting cloud backup for a first time, setting the bitmap of one snapshot as 1, and performing data copying on the other snapshot by taking the bitmap of the one snapshot as a reference.

3. The method according to claim 1, further comprising:
in response to there being the IO request of the host in the cloud volume, pausing the IO request of the host and expanding the snapshot volume of the snapshot started during the present cloud backup and the cloud volume;

expanding the bitmap of the snapshot started during the present cloud backup, and setting the bitmap obtained by expanding as the first preset value;

recovering the IO request of the host, and after the completion of the present cloud backup task, expanding the snapshot volume of the another snapshot that is not started in the process of the present cloud backup; and expanding the bitmap of the another snapshot that is not started in the process of the present cloud backup, and setting the bitmap obtained by expanding as the second preset value.

4. The method according to claim 1, wherein expanding the bitmap of the snapshot started during the present cloud backup, and setting the bitmap obtained by expanding as the first preset value comprises:

setting all bits of the bitmaps obtained by expanding as 1.

5. The method according to claim 4, wherein the expanding the bitmap of the another snapshot that is not started in the process of the present cloud backup, and setting the bitmap obtained by expanding as the second preset value comprises:

setting all bits of the bitmaps obtained by expanding as 0.

6. The method according to claim 1, wherein if a cloud backup operation is started again, the cloud volume, a snapshot volume 1, and a snapshot volume 2 all have expanded capacity, and newly expanded bitmap of the snapshot 1 is also marked as 1, so that newly expanded data are considered as data that changes when the cloud backup is started again, and the newly expanded data are also uploaded to a cloud.

7. The method according to claim 1, further comprising:
in response to there being the TO request of the host in the cloud volume, pausing the TO request of the host and expanding the snapshot volume of the snapshot started during the present cloud backup and the cloud volume;

expanding the bitmap of the snapshot started during the present cloud backup, and setting the bitmap obtained by expanding as the first preset value.

8. The method according to claim 7, wherein after setting the bitmap obtained by expanding as the first preset value, the method further comprises:

recovering the TO request of the host.

9. The method according to claim 7, wherein there are two snapshots and snapshot volumes in the cloud backup, when the present cloud backup task is completed, the snapshot volume of the another snapshot that is not started is expanded.

10. The method according to claim 2, wherein the one snapshot is the snapshot that is not started in the process of the present cloud backup, the other snapshot is the snapshot started during the present cloud backup.

11. The method according to claim 1, wherein setting a bitmap obtained by expanding as a first preset value comprises:

setting the bitmap obtained by expanding as 1.

12. The method according to claim 1, wherein setting a bitmap obtained by expanding as a second preset value comprises:

setting the bitmap obtained by expanding as 0.

13. A computer device, comprising: at least one processor, and a memory, wherein the memory stores computer instructions capable of running on the processor; and when executed by the processor, the instructions cause the processor to:

in response to receiving a cloud volume expansion instruction in a cloud backup process, determine whether there is an Input/Output (TO) request of a host in a cloud volume and confirm a snapshot started during present cloud backup;

in response to there being no IO request of the host in the cloud volume, expand a snapshot volume of the snapshot started during the present cloud backup and the cloud volume;

expand a bitmap of the snapshot started during the present cloud backup, and set a bitmap obtained by expanding as a first preset value;

after completion of a present cloud backup task, expand a snapshot volume of an another snapshot that is not started in a process of the present cloud backup; and expand a bitmap of the another snapshot that is not started in the process of the present cloud backup, and set a bitmap obtained by expanding as a second preset value.

14. The computer device according to claim 13, wherein when executed by the processor, the instructions cause the processor further to:

in response to starting cloud backup for a first time, set the bitmap of one snapshot as 1, and perform data copying on the other snapshot by taking the bitmap of the one snapshot as a reference.

15. The computer device according to claim 13, wherein when executed by the processor, the instructions cause the processor further to:

in response to there being the IO request of the host in the cloud volume, pause the IO request of the host and expand the snapshot volume of the snapshot started during the present cloud backup and the cloud volume;

expand the bitmap of the snapshot started during the present cloud backup, and set the bitmap obtained by expanding as the first preset value;

recover the IO request of the host, and after the completion of the present cloud backup task, expand the snapshot volume of the another snapshot that is not started in the process of the present cloud backup; and expand the bitmap of the another snapshot that is not started in the process of the present cloud backup, and set the bitmap obtained by expanding as the second preset value.

16. The computer device according to claim 13, wherein when executed by the processor, the instructions cause the processor further to:
  setting all bits of the bitmaps obtained by expanding as 1.

17. The computer device according to claim 16, wherein when executed by the processor, the instructions cause the processor further to:
  setting all bits of the bitmaps obtained by expanding as 0.

18. The computer device according to claim 13, wherein if a cloud backup operation is started again, the cloud volume, a snapshot volume 1, and a snapshot volume 2 all have expanded capacity, and newly expanded bitmap of the snapshot 1 is also marked as 1, so that newly expanded data are considered as data that changes when the cloud backup is started again, and the newly expanded data are also uploaded to a cloud.

19. The computer device according to claim 13, wherein when executed by the processor, the instructions cause the processor further to:
  in response to there being the TO request of the host in the cloud volume, pause the TO request of the host and expand the snapshot volume of the snapshot started during the present cloud backup and the cloud volume;
  expand the bitmap of the snapshot started during the present cloud backup, and set the bitmap obtained by expanding as the first preset value.

20. A non-transitory computer-readable storage medium, the non-transitory computer-readable storage medium storing a computer program, wherein when the computer program is executed by a processor, the computer program is configured to cause the processor to:
  in response to receiving a cloud volume expansion instruction in a cloud backup process, determine whether there is an Input/Output (IO) request of a host in a cloud volume and confirm a snapshot started during present cloud backup;
  in response to there being no IO request of the host in the cloud volume, expand a snapshot volume of the snapshot started during the present cloud backup and the cloud volume;
  expand a bitmap of the snapshot started during the present cloud backup, and set a bitmap obtained by expanding as a first preset value;
  after completion of a present cloud backup task, expand a snapshot volume of an another snapshot that is not started in a process of the present cloud backup; and
  expand a bitmap of the another snapshot that is not started in the process of the present cloud backup, and set a bitmap obtained by expanding as a second preset value.

* * * * *